(No Model.)
J. COTTET.
PINCE NEZ.
No. 560,895.    Patented May 26, 1896.
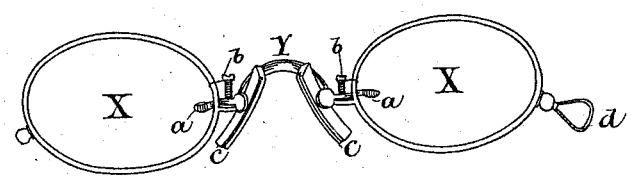
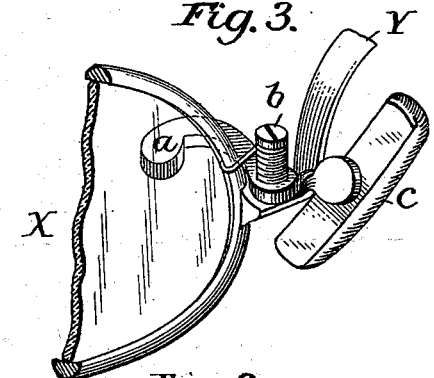
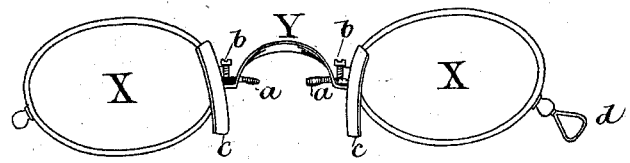
Witnesses:
I. A. Fairgrieve
F. Wise
Inventor:
Jules Cottet
by Foster Freeman
attorneys.

UNITED STATES PATENT OFFICE.

JULES COTTET, OF MOREZ-DU-JURA, FRANCE, ASSIGNOR TO JOSEPH RAPHAEL, OF LONDON, ENGLAND.

PINCE-NEZ.

SPECIFICATION forming part of Letters Patent No. 560,895, dated May 26, 1896.

Application filed June 1, 1895. Serial No. 551,379. (No model.) Patented in England December 2, 1893, No. 23,129, and April 27, 1894, No. 8,366, and in France May 17, 1894, No. 238,583.

*To all whom it may concern:*

Be it known that I, JULES COTTET, spectacle manufacturer, a citizen of the Republic of France, residing at Morez-du-Jura, France, have invented certain new and useful Improvements in Pince-Nez, (Spectacles,) (for which I have obtained Letters Patent of Great Britain, No. 23,129, dated December 2, 1893, and No. 8,366, dated April 27, 1894, and of France, No. 238,583, dated May 17, 1894,) of which the following is a specification.

Pince-nez or folding glasses have hitherto been constructed with a spring bridging the nose of the wearer for the purpose of connecting the two glasses. They are also provided with two pieces, (at the sides of and between the glasses,) which rest on either side of the nose. The upper ends of these pieces are slotted, so as to allow of the bent termination of the connecting-spring sliding therein, and the lower portion is hinged or secured in such a way as to give an outward tendency to the upper part, thus producing the desired elasticity for adjusting the glasses in position on the nose of the wearer. It is a well-known fact, however, that this connecting-spring is a source of great annoyance, and it is to obviate this defect and to lighten and cheapen the cost of the frames that my invention has been designed.

In the accompanying drawings, Figures 1 and 2 are views of a pince-nez, taken from opposite sides to show the construction and arrangement of my improvements. Fig. 3 is an enlarged view in perspective of a portion of an eyeglass or spectacle, and representing the construction and arrangement of my improved devices more clearly.

In carrying out my invention I take by way of example a pair of ordinary spectacle-frames (minus the side pieces) marked X in the accompanying drawings. I flatten the base of both sides of the rigid bridge-piece Y and tap a hole to receive two small screws $b$, one on either side. On each of these screws $b$, I wind for about two-thirds of its length a piece of fine wire to form a coiled or spiral spring $d$. I then place over each tapped hole a piece of metal in the form of a lever, said levers $a$ carrying at one end the pieces or plaquettes $c$ to rest on either side of the nose when the glasses are in use. I now insert through the center of the levers and tapped holes the screws $b$ and secure them therein at about a third of their length or up to where the wires $d$ are wound thereon. One end of each wire or coiled spring is secured to the frame holding the glass, and the other end is attached to the piece of metal or lever $a$. The said levers $a$ are arranged at right angles to the vertical plane of the eyeglass-frame or lenses thereof, and the outer ends of these levers constitute finger-pieces, which are readily grasped and drawn together by pressure of the fingers of the operator or user, and in this way the eyeglasses may be both placed upon the nose and removed therefrom with the greatest facility, and as distinguished from that form of lever which operates in a vertical plane parallel to the plane of the lenses the present arrangement is exceedingly advantageous, since the levers are more easily taken hold of, and the glasses are more quickly and readily adjusted to the eyes, and it does not require both hands to adjust or remove the glasses.

From the foregoing it will be readily understood that by pressing the two levers $a$ together it will open outward or separate the pieces or plaquettes that abut on the nose, and when placed in position by simply releasing the levers the glasses will be left or remain securely and comfortably adjusted on the nose of the wearer.

It will therefore be apparent that such a simple yet efficient contrivance, necessitating only the employment of one hand (whereas the old glasses almost invariably require the use of both) to operate, also the doing away with the unsightly heavy connecting-spring and clumsy mode of adjustment hitherto in use, will be found a great advantage to users of the article.

Without limiting myself to the precise construction and arrangement of parts shown, what I claim is—

In pince-nez, the combination of the frame united by a bridge-piece having the base portions thereof flattened at each side and tapped with holes, screws fastened in said holes, levers pivotally supported upon the frame by said screws and carrying at the inner ends thereof the plaquettes for resting against the sides of the nose, and the springs coiled around the screws and having one of their ends bearing against the frame and the other against the levers, substantially in the manner and for the purpose shown and described.

Signed at Morez-du-Jura this 17th day of May, 1895.

J. COTTET.

Witnesses:
 ALLAMAND ARTHUR,
 PY. ALEXANDRE.